US010055965B2

(12) United States Patent
Prabhakar et al.

(10) Patent No.: US 10,055,965 B2
(45) Date of Patent: Aug. 21, 2018

(54) DETECTOR-TO-DETECTOR ALERTS

(71) Applicant: Fluke Corporation, Everett, WA (US)

(72) Inventors: Dileepa Prabhakar, Mill Creek, WA (US); Christopher Corrigan, Seattle, WA (US); Pronitha Shankarananda, Bellevue, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/365,617

(22) Filed: Nov. 30, 2016

(65) Prior Publication Data

US 2017/0154518 A1 Jun. 1, 2017

Related U.S. Application Data

(60) Provisional application No. 62/261,190, filed on Nov. 30, 2015.

(51) Int. Cl.
*G08B 1/08* (2006.01)
*G08B 21/12* (2006.01)
(Continued)

(52) U.S. Cl.
CPC ............... *G08B 21/12* (2013.01); *G08B 7/06* (2013.01); *G08B 25/009* (2013.01); *G08B 25/10* (2013.01); *G08B 25/001* (2013.01); *G08B 25/007* (2013.01)

(58) Field of Classification Search
CPC ........ G08B 21/12; G08B 7/06; G08B 25/009; G08B 25/10; G08B 25/001; G08B 25/007
(Continued)

(56) References Cited

U.S. PATENT DOCUMENTS 4,258,002 A * 3/1981 Barr ........................ G01N 27/16 422/95
7,263,379 B1 * 8/2007 Parkulo .................. G08B 21/02 340/501
(Continued)

FOREIGN PATENT DOCUMENTS

JP 2011-107964 A 6/2011
WO 2013/116933 A1 8/2013
WO 2015/054288 A1 4/2015

OTHER PUBLICATIONS

Extended European Search Report, dated Feb. 24, 2017, for European Application No. 16201517.6-1555, 9 pages.
(Continued)

*Primary Examiner* — Zhen Y Wu
(74) *Attorney, Agent, or Firm* — Seed IP Law Group LLP

(57) ABSTRACT

An alert system and method includes at least first and second detectors that each includes environmental condition detection circuitry, data processing circuitry, and wireless communication circuitry. The first and second detectors are respectively carried by first and second users. The first and second detectors detect environmental conditions in a vicinity of the respective detectors and communicate detection data to the respective data processing circuitry. In response to detection of a hazardous environmental condition by the first detector, the first detector provides an alert notification to the first user and communicates the alert to the second detector via wireless communication, and in response to receipt of an alert from the first detector, the second detector transmits the alert to another detector or device via wireless communication. A communicated or transmitted alert may include an incrementing indicator of a number of hops or levels of transmission of the alert.

16 Claims, 3 Drawing Sheets

(51) Int. Cl.
*G08B 25/10* (2006.01)
*G08B 7/06* (2006.01)
*G08B 25/00* (2006.01)

(58) Field of Classification Search
USPC .................................................... 340/539.22
See application file for complete search history.

(56) References Cited

U.S. PATENT DOCUMENTS 8,330,605 B2 12/2012 Johnson, Jr. et al.
8,400,317 B2 3/2013 Johnson, Jr. et al.
2002/0101247 A1* 8/2002 Whynall ............ G01N 33/0018 324/460
2002/0142478 A1* 10/2002 Wado ................... G01N 27/124 436/151
2004/0004547 A1* 1/2004 Appelt ................... G08B 21/02 340/573.1
2009/0136885 A1* 5/2009 Manno ..................... B27H 5/08 432/37
2010/0063748 A1* 3/2010 Mottier .............. G01N 21/3504 702/24
2011/0259080 A1* 10/2011 Ratcliffe ................ G01N 27/12 73/23.35
2012/0169289 A1* 7/2012 Kim ...................... H01M 2/105 320/134
2012/0269194 A1* 10/2012 Kobayashi .............. H04L 47/40 370/389
2012/0280818 A1* 11/2012 Johnson, Jr. .......... H04W 4/043 340/632
2013/0102257 A1* 4/2013 Bedi ..................... H04W 4/023 455/66.1
2013/0209315 A1* 8/2013 Kimura .............. G01N 25/4826 422/88
2014/0028829 A1 1/2014 Kieffer et al.
2015/0075256 A1* 3/2015 Basham ............. G01N 33/0016 73/31.01
2016/0081415 A1* 3/2016 Handshaw ............. A42B 3/046 2/5
2016/0109495 A1* 4/2016 Sterkel .................. G06F 17/212 702/62
2016/0119739 A1* 4/2016 Hampel .................. H04W 4/70 370/315

OTHER PUBLICATIONS

Partial European Search Report, dated May 12, 2017, for European Application No. 16201438.5-1810, 17 pages.
Accenture Plant and Commercial Services, “Helping Achieve High Performance Safety using Intelligent Industrial Mobility” Copyright © 2013 Accenture, 8 pages.
Bleiberg, J. et al., “Three Ways Mesh Networks with Peer-to-Peer Connections Can Revolutionize Communications (without the Internet)”, Apr. 25, 2014, 4 pages.

* cited by examiner

DETECTOR-TO-DETECTOR ALERTS

BACKGROUND

Technical Field

This disclosure pertains to detection systems, and particularly to systems that are used to detect environmental conditions.

Description of the Related Art

Environmental condition detection systems are used to detect environmental conditions that may be dangerous to living beings or equipment. For example, portable gas detectors are used as personal safety tools to detect the lack of certain gases such as oxygen, or to detect the presence of certain dangerous gases, such as combustible or toxic gases. Gas detectors may be used for spot testing of leaks or for use in confined spaces and for other portable/personal use in hazardous environments. Portable gas detectors may be configured, for example, as a hand-held, clip-on, or wearable devices and include all types of single-gas and multi-gas detectors.

In a confined space, working conditions are typically difficult and dangerous. Portable gas detectors help ensure that the user is alerted to unsafe conditions of gas levels. In confined space situations, regulations typically require an attendant to be stationed outside the confined space area for safety reasons. In case of an emergency situation, the attendant is expected notify emergency services and a supervisor.

In some situations, including personal use situations where the detector is carried by a person during normal work as a safety measure, there may be no "attendant" nearby. The user of the detector may be alone and walk into a hazardous environment, such as a toxic gas cloud, potentially resulting in a fatality even with the detector sounding an alert.

In these situations, other individuals in the vicinity of the detector may not immediately be made aware of an alert generated by the detector. In confined space situations, the onus is on the attendant to notify others of hazardous situations, including emergency services personnel and the operations team. If the attendant is disabled for some reason, such disability further limits how quickly and widely the safety alert information reaches the necessary personnel.

The present disclosure provides solutions to deficiencies and drawbacks in current environmental condition detection systems.

BRIEF SUMMARY

In various embodiments, an alert system of the present disclosure includes a first detector and a second detector. The first detector includes environmental condition detection circuitry, data processing circuitry, and wireless communication circuitry, and is configured to be carried by a first user. The environmental condition detection circuitry of the first detector detects environmental conditions in a vicinity of the first detector and communicates detection data to the data processing circuitry of the first detector.

The second detector also includes environmental condition detection circuitry, data processing circuitry, and wireless communication circuitry, and is configured to be carried by a second user. The environmental condition detection circuitry of the second detector detects environmental conditions in a vicinity of the second detector and communicates detection data to the data processing circuitry of the second detector.

In response to detection of a hazardous environmental condition by the first detector, the data processing circuitry of the first detector provides an alert notification to the first user and communicates the alert to the second detector via the wireless communication circuitry of the first detector. In response to receipt of an alert from the first detector, the data processing circuitry of the second detector transmits the alert to another detector or device via the wireless communication circuitry of the second detector.

In various embodiments, in response to detection of a hazardous environmental condition by the second detector, the data processing circuitry of the second detector may provide an alert notification to the second user and communicates the alert to the first detector via the wireless communication circuitry of the second detector, and in response to receipt of an alert from the second detector, the data processing circuitry of the first detector may transmit the alert to another detector or device via the wireless communication circuitry of the first detector.

The first detector may broadcast the alert in an ad hoc communication to the second detector without knowing that the second detector is in transmission range of the first detector. Likewise, the second detector may broadcast the alert in an ad hoc communication to the first detector without knowing that the first detector is in transmission range of the second detector.

The first and second detectors may communicate in a self-forming network that forms as the first and second detectors are carried within transmission range of each other. The second detector may be a master device that is paired with the first detector and with additional detectors that each have environmental condition detection circuitry, data processing circuitry, and wireless communication circuitry and are capable of providing an alert notification to users carrying the additional detectors.

In various embodiments, the alert system may further include a third detector that also has environmental condition detection circuitry, data processing circuitry, and wireless communication circuitry, and is configured to be carried by a third user. The environmental condition detection circuitry of the third detector detects environmental conditions in a vicinity of the third detector and communicates detection data to the data processing circuitry of the third detector.

In response to detection of a hazardous environmental condition by the first detector, the data processing circuitry of the first detector further communicates the alert to the third detector via the wireless communication circuitry of the first detector, and in response to receipt of an alert from the first detector, the data processing circuitry of the third detector transmits the alert to another detector or device via the wireless communication circuitry of the third detector.

The first detector may further include location detection circuitry, and in response to detection of a hazardous environmental condition by the first detector, the data processing circuitry of the first detector further communicates location data reflecting a location of the first detector to the second detector via the wireless communication circuitry of the first detector.

The first detector may further include one or more biometric sensors configured to monitor biometric information of the first user, and in response to detection of a hazardous environmental condition by the first detector, the data processing circuitry of the first detector further communicates the biometric information of the first user to the second detector via the wireless communication circuitry of the first detector.

In various embodiments, when communicating the alert to the second detector, the data processing circuitry of the first detector may include an indicator of a number of hops or levels of transmission of the alert with the communication, and before transmitting the alert to another detector or device, the data processing circuitry of the second detector increments the indicator of the number of hops or levels of transmission of the alert and includes the incremented indicator with the transmission to the another detector or device. The another detector or device may be a third detector that includes environmental condition detection circuitry, data processing circuitry, and wireless communication circuitry, and is configured to be carried by a third user. The environmental condition detection circuitry of the third detector detects environmental conditions in a vicinity of the third detector and communicates detection data to the data processing circuitry of the third detector. In response to receipt of the alert and incremented indicator from the second detector, the data processing circuitry of the third detector further increments the indicator and transmits the alert with the further incremented indicator to yet another device via the wireless communication circuitry of the third detector.

In various embodiments, the alert system may further include additional detectors or devices that receive the alert from the first detector or the second detector with an indicator of the number of hops or levels of transmission of the alert. Each of the additional detectors or devices increments the indicator received with the respective alert before transmitting the alert to yet another device. Each additional detector is configured to be carried by a user and includes environmental condition detection circuitry, data processing circuitry, and wireless communication circuitry. The environmental condition detection circuitry of each additional detector detects environmental conditions in a vicinity of the additional detector and communicates detection data to the data processing circuitry of the additional detector.

In various embodiments, in response to receipt of an alert, the data processing circuitry of the second detector and/or the additional detectors or devices may determine whether to provide an alert notification to a user and/or transmit the alert to yet another detector or device based on at least one of a determined proximity to a detector or device that transmitted the alert, a determined duration of time from when a detector or device transmitted the alert, a determined severity of the hazardous environmental condition indicated by the received alert, or the indicator of the number of hops or levels of transmission of the received alert.

When it is determined to provide an alert notification to a user, a sensory output of the alert notification may be determined based on at least one of a determined proximity to the detector or device that transmitted the alert, a determined duration of time from when a detector or device transmitted the alert, a determined severity of the hazardous environmental condition indicated by the received alert, or the indicator of the number of hops or levels of transmission of the received alert.

In various embodiments, in response to receipt of an alert from the first detector, the data processing circuitry of the second detector determines whether to provide an alert notification to the second user in addition to transmitting the alert to another detector or device.

The first and second detectors may further include a user interface that, when activated by a user, causes the data processing circuitry of the respective first or second detector to not transmit the alert to another detector or device.

Also described herein is a method of communicating an alert in a network of detectors in wireless transmission range of one another. Each detector is configured to be carried by a user and includes environmental condition detection circuitry, data processing circuitry, and wireless communication circuitry. In various embodiments, the method includes, for each detector, detecting an environmental condition in a vicinity of the respective detector; communicating detection data to the data processing circuitry of the respective detector; in response to detection of a hazardous environmental condition by a first detector, providing an alert notification to the user carrying the first detector and communicating the alert to one or more second detectors via the wireless communication circuitry of the first detector; and in response to receipt of an alert from the first detector, transmitting the alert to yet another detector or device via the wireless communication circuitry of the respective second detector.

The method may further comprise including an indicator of a number of hops or levels of transmission of the alert when communicating the alert to the one or more second detectors, and before transmitting the alert from the one or more second detectors to yet another detector or device, further incrementing the indicator of the number of hops or levels of transmission and including the further incremented indicator with the transmission.

In response to receipt of an alert, it may be determined whether to provide an alert notification to a user and/or transmit the alert to another detector or device based on at least one of a determined proximity to a detector or device that transmitted the alert, a determined duration of time from when a detector or device transmitted the alert, a determined severity of the hazardous environmental condition indicated by the received alert, or the indicator of the number of hops or levels of transmission of the received alert.

When it is determined to indicate an alert to a user, a sensory output of the alert notification may be further determined based on at least one of a determined proximity to the detector or device that transmitted the alert, a determined duration of time from when a detector or device transmitted the alert, a determined severity of the hazardous environmental condition indicated by the received alert, or the indicator of the number of hops or levels of transmission of the received alert.

DETAILED DESCRIPTION

Figure 1:
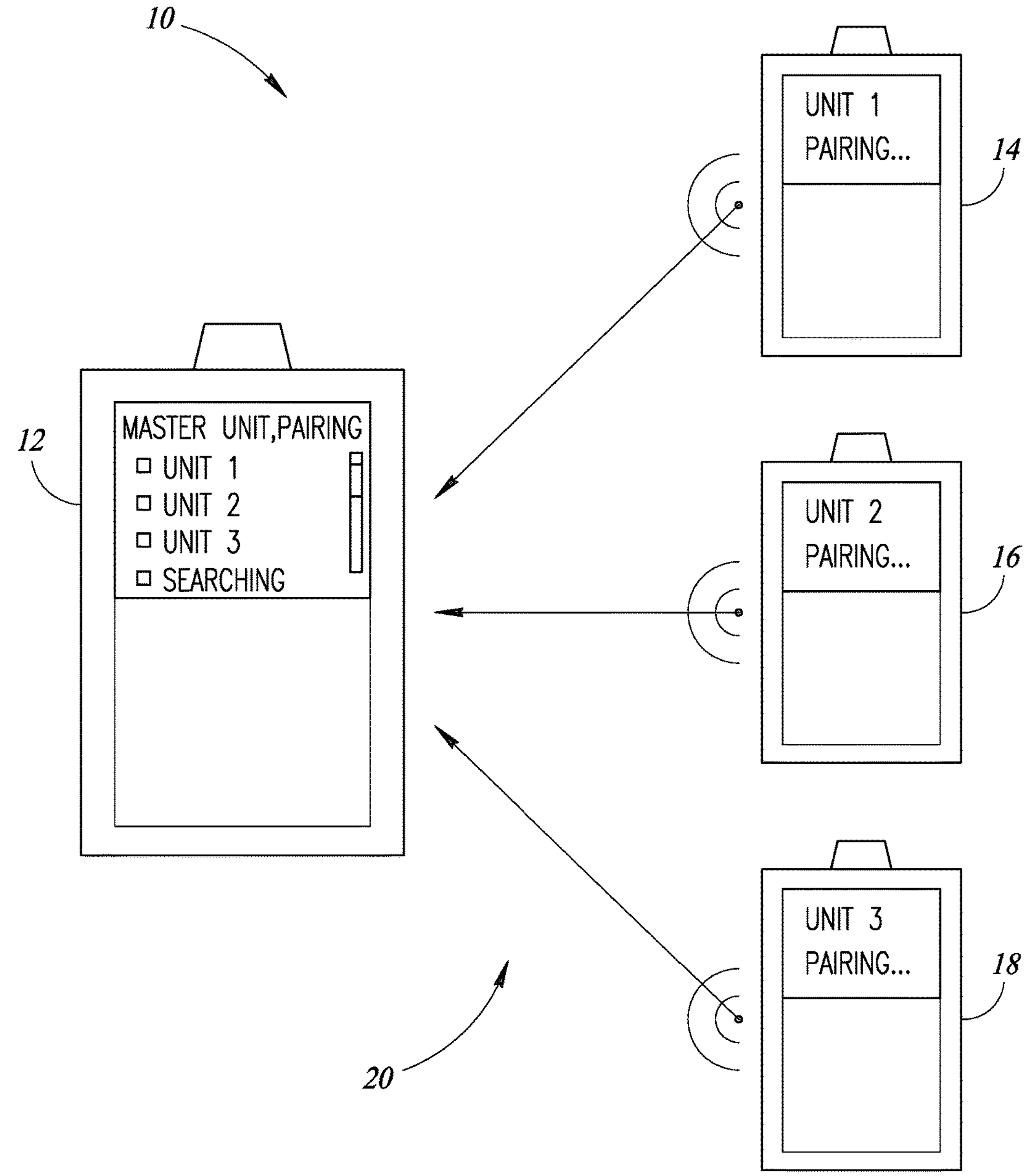
FIG. 1 is a pictorial diagram illustrating an alert system with multiple detectors that are usable for monitoring one or more environmental conditions.

Detector-to-detector alert systems of the present disclosure provide a way to disseminate alerts to other detectors or devices when one or more detectors detect an unsafe environmental condition. As will be apparent from the following description, alert information can be disseminated among detectors in the system in different ways. In some embodiments, information concerning an alert may be transmitted as a wireless broadcast from a first detector to other detectors within the first detector's range of transmission. This broadcast may occur ad hoc or the information may be transmitted through a pre-established or self-forming mesh or star network of detectors and other compatible devices, such as network repeaters, base stations, hubs, etc. In other embodiments, information concerning an alert may be transmitted as a wireless communication to a master device, which may be another detector or a different non-detector computing device that facilitates further communication of the alert information to peer detectors in the system.

As contemplated herein, self-forming networks include other detectors and non-detector devices that are compatible with the detector-to-detector alert system. The wireless medium used to convey alert information between detectors and other devices may be include (but is not limited to) electromagnetic communication, e.g., radio frequency or light-based wireless systems as well as inaudible high-frequency sound-based communication or audible sound-based communication, or any combination of the above. For example, lower power electromagnetic communication systems may operate according to ZigBee, Wi-Fi, or Bluetooth standards. Alternatively or in addition, infrared or other light-based signals may be used. In other embodiments, audible or inaudible sounds may be transmitted and received between detectors. Cellular and/or satellite communication technology may be used in yet other applications or situations.

While embodiments of the alert systems and methods described herein relate to the use of gas detectors for monitoring gas exposure, the alert systems may also be used to monitor the exposure of individuals to other hazardous materials. The detector-to-detector alert systems and methods described herein may be embodied in different forms as required for monitoring different environmental conditions and for notifying individuals when conditions indicate a hazardous environment.

The alert systems and methods described herein provide for sharing of alert information among individuals carrying detectors in a work area, which may be a confined space or other work area. Each individual entering the area may be provided with a gas detector that monitors gas exposure in the vicinity of the detector. When a detector detects the presence or absence of gas such that an alert threshold is met, the detector initiates an alert notification to the individual carrying the detector as well as communicates with other detectors carried by individuals in the transmission range of the detector. The detector may also initiate communication with emergency responders and/or a central station.

In some embodiments, the detector may include additional sensors 42 that monitor biometric information, such as heart rate, blood pressure, or other health indicators of the individual carrying the detector. In these or other embodiments, the detector may include a panic button that, when activated by an individual, initiates an alert that is communicated to other detectors in the system.

Notably, the peer-to-peer communication implemented by the detectors in the alert system disclosed herein allows alert information to be quickly propagated among detectors in the vicinity of the detector that is generating the alert, without requiring that the alert information be first communicated to a centralized remote server. The improved communication of the present disclosure allows other individuals who may be exposed to the hazardous condition to more quickly evaluate the situation and possibly evacuate from the hazardous area.

FIG. 1 illustrates an embodiment of an alert system 10 with multiple detectors that are usable for monitoring one or more environmental conditions. The system includes a master detector 12 or an alternative computing device such as a mobile phone (e.g., programmed with an app) that is paired with one or more slave detectors 14, 16, 18 for the purpose of logging, monitoring, and relaying alerts via a wireless medium 20. As is understood from the disclosure herein, variations in the arrangement, type, and operation of the components shown in FIG. 1 may be made without departing from the scope of the present disclosure. Additional, different, or fewer components or different communication topologies may be employed.

Users of the detectors 12, 14, 16, 18 may be individuals that work in a confined space or other hazardous work environment, such as in a refinery, power plant, chemical plant, or mine. The detectors 12, 14, 16, 18 are configured to detect harmful levels of one or more hazardous materials, including for example, hazardous gases, chemical compounds, or radiation while the individuals carrying the detectors are working in the hazardous work environment. Alternatively or in addition, the detectors 12, 14, 16, 18 may be configured to detect the lack of oxygen, e.g., in a mine. The users may each wear or otherwise carry a detector for monitoring the users' exposure to hazardous conditions.

Figure 2:
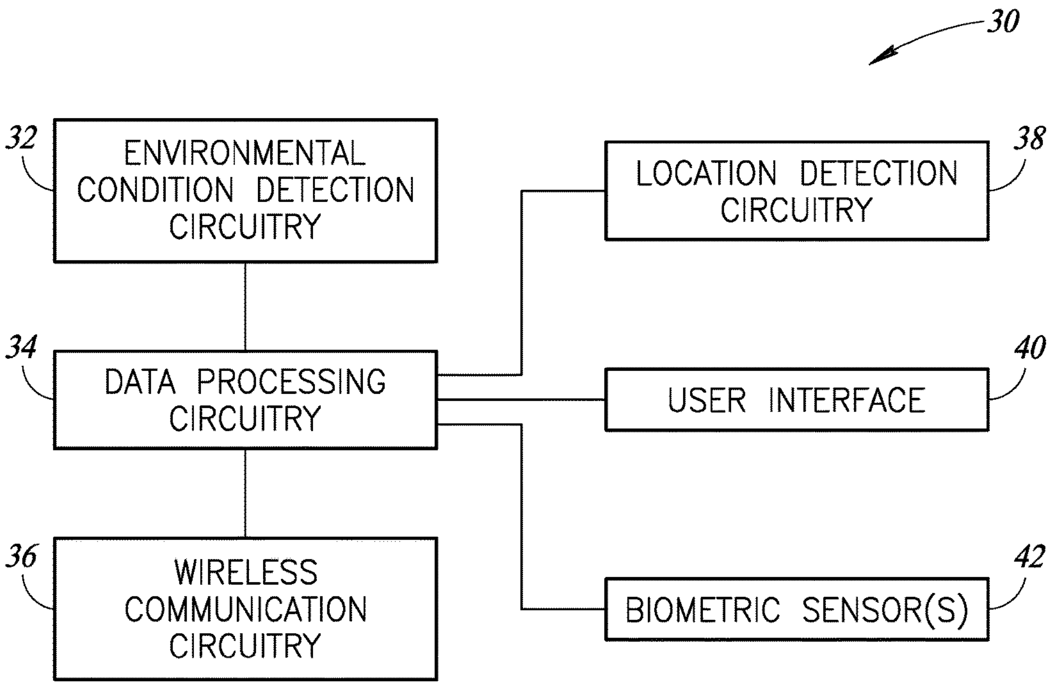
FIG. 2 is a block diagram of an embodiment of a detector.

As illustrated in FIG. 2, a detector 30 (which may be one of the detectors 12, 14, 16, 18 shown in FIG. 1) generally comprises environmental condition detection circuitry 32, including one or more sensors adapted to detect environmental conditions in the vicinity of the detector 30. The environmental condition detection circuitry 32 is configured produce detection data based on measurements obtained by the one or more sensors. The detector 30 further comprises data processing circuitry 34 and wireless communication circuitry 36. The data processing circuitry 34 may include one or more processors that operate in accordance with logic in the detector 30, e.g., program instructions that are stored in a memory. Other embodiments of the data processing circuitry 34 may include application-specific integrated circuits or other computing hardware and/or software configured to implement the operations of a detector as described herein.

The wireless communications circuitry 36 in a detector may include a transceiver that is capable of receiving and transmitting signals, such as electromagnetic or sound-based signals, that carry information to or from the detector and other detectors. The wireless communications circuitry 36 thus provides an interface for communication with other detectors or devices (such as a programmed mobile phone) in the alert system. In some embodiments, the detector 30 may further include location detection circuitry 38 adapted to determine a relative or absolute physical location of the respective detector, including but not limited to GPS, cellular or wireless network triangulation circuitry. Location data produced by the location detection circuitry 38 may be communicated to one or more other detectors or devices via the wireless communications circuitry 36 in addition to, or alternative to, communication of detection data derived from the measurements obtained by the one or more sensors in the detection circuitry 32.

The interface provided by the wireless communications circuitry 36 may transmit data indicating the amount of hazardous gas that a user of the detector 30 has been exposed to, and possibly the location of the user, to one or more other detectors 30. In the system shown in FIG. 1, a master detector 12 (or an alternative computing device) is paired with multiple slave detectors 14, 16, 18. The master detector 12 includes logic that causes the detector 12 to log data received from the detectors 14, 16, 18, to monitor communications for alert conditions, and to relay alert information to other detectors 14, 16, 18 via the wireless medium 20.

Gas exposure and possibly location data of a detector 14, 16, 18 may be transmitted to the detector 12 on a periodic basis. The time between transmissions of each detector 14, 16, 18 may be configured automatically and/or manually. For example, if it is anticipated that the user will be entering an area with a higher potential for exposure to hazardous gases, the user may carry a detector 14, 16, 18 that is configured to transmit gas exposure information to the detector 12 more frequently. If a gas exposure detected by the detector 14, 16, 18 approaches a dangerous level, the detector 14, 16, 18 may automatically commence to transmit the gas exposure information to detector 12 more frequently. There may be, for example, one or more gas exposure thresholds or limits programmed within the detector 14, 16, 18 that, when met, may cause the detector to increase the frequency of transmission of gas exposure information to the master detector 12. In some embodiments, the detector 14, 16, 18 may monitor gas exposure without transmitting information to the master detector 12 or other detectors until an alert is generated by the detector 14, 16, 18 detecting a gas exposure meeting a programmed threshold. In yet other embodiments, a detector 14, 16, 18 may not transmit gas exposure information to other detectors, but only transmit alert information to other detectors when the detector 14, 16, 18 generates a local alert.

Returning to FIG. 2, when generating a local alert a detector 30 may produce an alert notification to the individual user carrying the detector 30. The alert notification may include any form of visual, aural, or haptic sensory output to the individual. For example, one or more LEDs on the detector 30 may produce a flashing signal, while an alert may sound and/or the detector may vibrate. The detector 30 may include a user interface 40, such as a button, that allows the individual carrying the detector 30 to acknowledge the local alert. If the individual does not acknowledge the local alert, the detector 30 may heighten the severity of the alert that is transmitted to other detectors, as described herein.

While FIG. 1 illustrates an embodiment in which detectors 12, 14, 16, 18 are arranged in a master-slave relationship where the master detector or device 12 facilitates the dissemination of alerts between peer detectors 14, 16, 18, other embodiments of the alerting system may include direct ad hoc communications between peer detectors. In yet other embodiments, the detectors 12, 14, 16, 18 may be organized in one or more dynamic self-forming or preset networks where detectors are aware of peer detectors that are adjacent in the network and communicate alert information directly with such adjacent detectors.

Figure 3:
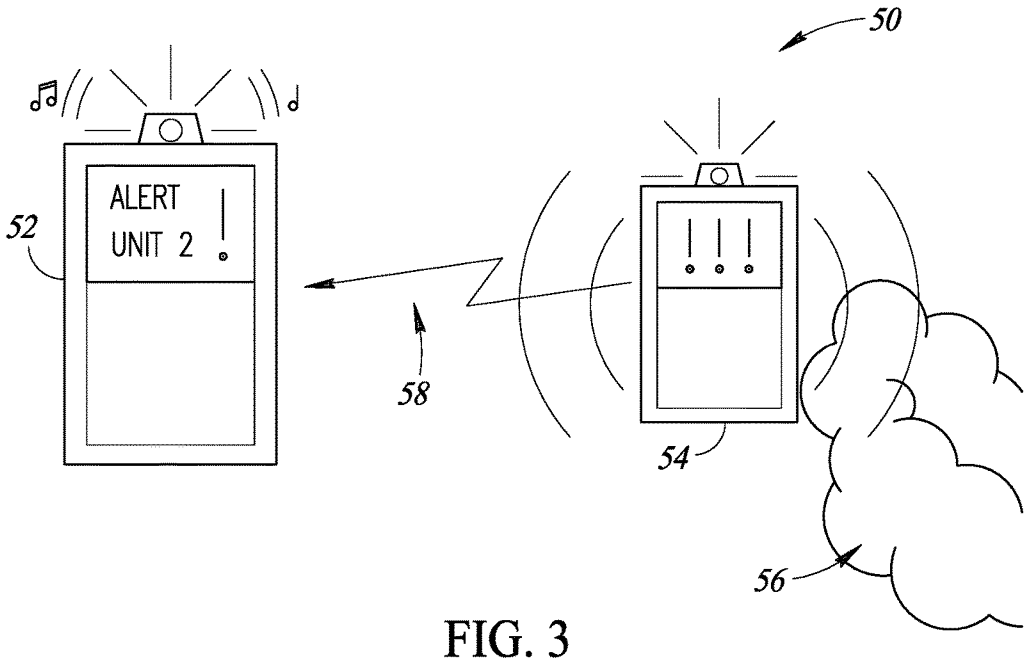
FIG. 3 is a pictorial diagram illustrating an alert system with alert propagation between detectors via a wireless medium.

FIG. 3 illustrates an alert system 50 providing an alert propagation between detectors 52 and 54 via a wireless medium 58. For example, when the detector 54 has detected a local environmental condition 56 that the merits generating an alert, a local alert notification is provided to the user of the detector 54 and information concerning the alert is transmitted via the wireless communications circuitry in the detector 54 to the wireless communications circuitry in the peer detector 52. The wireless medium 58 may provide for electromagnetic or sound-based communication of information between the detector 52 and the detector 54.

In some embodiments, for example, the detectors 52, 54 may be tuned to a particular frequency or channel to communicate information with peer detectors. Encryption technologies may be used to secure the communications between the detectors 52, 54. When a detector 52, 54 is not transmitting information, the wireless communications circuitry in the respective detector may periodically or continuously listen for communications from other detectors 52, 54 at the particular frequency or channel. A detector 52, 54 that has detected a hazardous condition and is generating a local alert may thus transmit information concerning the alert to other detectors 52, 54 that are listening to the particular frequency or channel. In such embodiments, the alert may be broadcast to other detectors 52, 54 within the vicinity or transmission range of the alert-generating detector.

In cases where multiple detectors 52, 54 may attempt to simultaneously broadcast alert information to other detectors, contention protocols may be used to ensure that each information broadcast is properly received by the other detectors. For example, overlapping information broadcasts may be repeated by the detectors 52, 54 at intervals that separate the contending transmissions. Different signal encoding technologies may also be used to help separate potentially contending transmissions.

In alert systems where the detectors 52, 54 are organized in a network, whether the network be preset or self-forming, the detectors 52, 54 may address their transmissions of alert information to known adjacent detectors. If desired, handshake technologies or acknowledgements may be used to ensure that communicated alert information has been properly received by the adjacent detectors.

The alert vicinity of a detector 52, 54 may be ad hoc, for example as detectors move in and out of transmission range of one another. In such embodiments, those detectors 52, 54 that are within the range of transmission of the alert-generating detector may receive a broadcast of the alert information from the alert-generating detector. In other embodiments, the alert vicinity of a detector 52, 54 may be user defined (e.g., by manually pairing detectors and other devices, or otherwise organizing the communication paths between the detectors and devices). Detectors 52, 54 may be configured to periodically transmit a polling signal to other detectors 52, 54 within the transmission range of the detector and receive information from the other detectors identifying their presence. The detectors 52, 54 may also exchange information to determine adjacency of the detectors in a network topology.

Detectors 52, 54 receiving alert information may in turn transmit some or all of the alert information to yet other detectors or devices (such as a programmed mobile phone) in their alert vicinity. Alert information may thus be propagated from one detector 52, 54 to another detector 52, 54 until all detectors or other devices in the system have been alerted. Alternatively, the transmission of alert information may be controlled so that only a subset of detectors and devices in the system receive and/or act on the alert information. Controlling the transmission of alert information may be advisable, for example, in large industrial plants where a local alert may be pertinent to individual users within a certain proximity to the alert-generating detector, but not to all detectors and individuals in the entire industrial plant.

When alert information is transmitted, the alert information may include a count of the number of hops or levels of transmission of the alert information, the count being incremented when a detector transmits the alert to one or more other detectors or devices. When the number of hops or levels of transmission reaches a threshold, further transmission of the alert information may be stopped. The number of hops or levels of transmission may be programmed in the detectors or it may be dynamically determined according to one or more criteria that, for example, considers the severity of the alert or other reasons for expanding or reducing the reach of transmission of alert information.

The sensory output of an alert notification may be distinct depending whether the alert is locally generated or is received from another detector. Distinct notifications help distinguish between a local alert that may represent a higher risk to the individual carrying the detector, and a propagated alert that may represent a lower risk to the individuals carrying the other detectors. For example, different combinations of light, sound, or vibrations may signal whether the alert has been locally generated or received from another detector.

Figure 4:
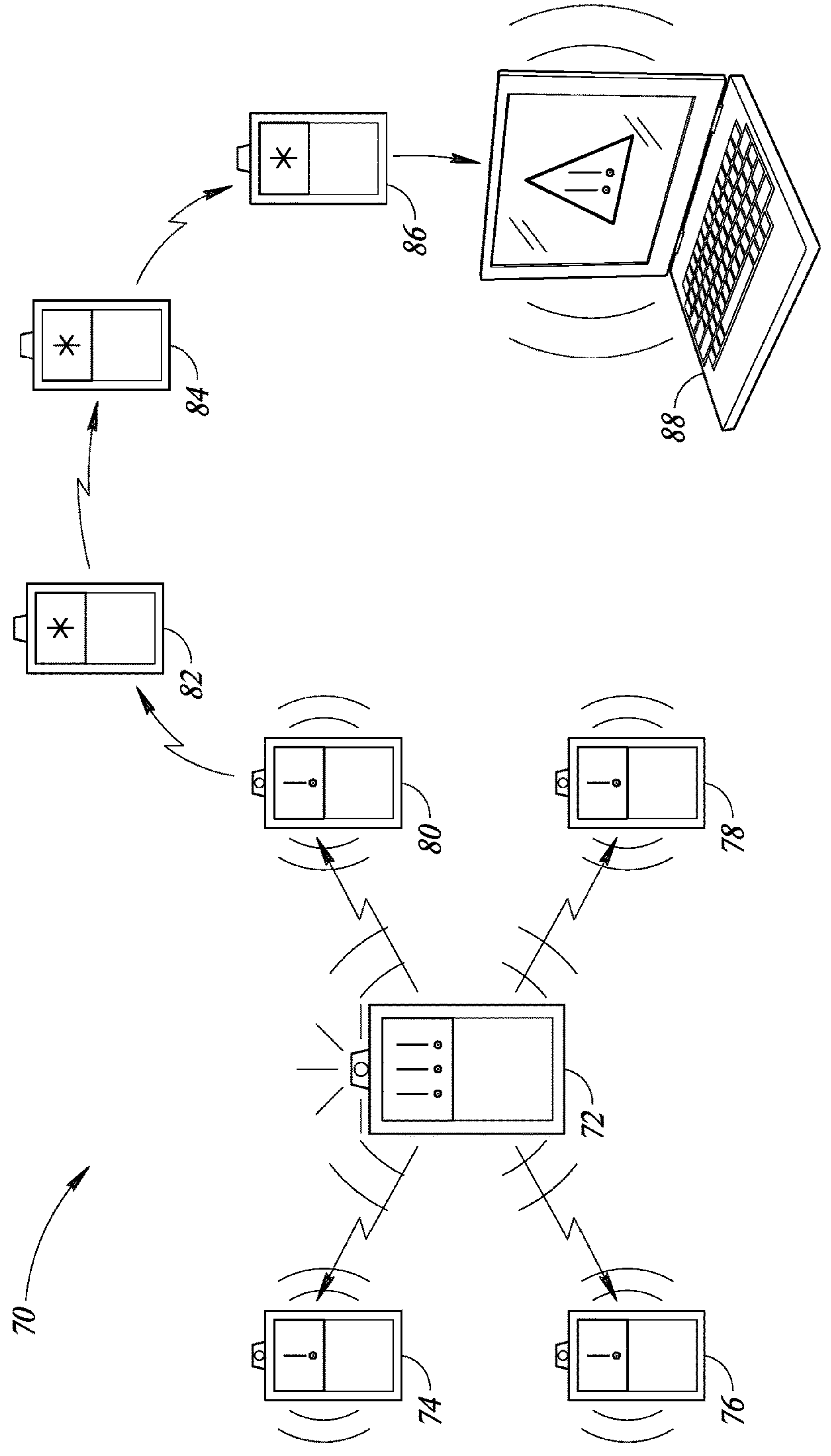
FIG. 4 is a pictorial diagram illustrating an example of an alert relay/propagation between detectors and other compatible devices up to a control room/supervisor.

FIG. 4 illustrates an example in which an alert is relayed or propagated between detectors and/or other compatible devices 72-86 up to a control room/supervisor 88. A distinct alert is given at the source that is typical of a gas detector, and alerts given at other levels of propagation are distinguishable from the alert at the source detector. More specifically, at the source (i.e., the alert-generating detector 72), a distinct alert notification is provided indicating a "Level 0" alert. Such alert notification may be typical of known gas detectors. As alert information is transmitted by the alert-generating detector 72 to other peer detectors 74, 76, 78, 80 in the system, and from a peer detector to yet other detectors or devices 82, 84, 86, the alert notifications may progress (e.g., be incremented) at each level of transmission from a "Level 0" alert to a "Level 1," "Level 2," "Level 3," etc., alert depending on the number of times the alert information has been transmitted. At each level, the alert notification made by the respective detectors 74-86 may be clearly distinguishable from the Level 0 alert notification made by the alert-generating detector 72. Generally, it is expected that at each incrementally higher level of transmission, the respective detector in the transmission path (e.g., detectors 82-86) is farther away from the original alert-generating detector 72 and thus the form of notification of the alert by the respective detector may be commensurate with the lower expected risk presented to the user of the detector. In such cases, for example, higher risk notifications may include multiple elements of sensory output, such as light, sound, or vibration, while lower risk notifications may be limited, e.g., to one such mode of communication. In other cases, the color or frequency of light, sound, or vibration may be different according to different levels of transmission or risk presented by a particular alert.

Alert information may also include time data representing a time or passage of time from when the alert was initially generated. The type and form of alert notifications at each level of transmission of the alert information may be modified in accordance with the time or passage of time data in the alert information.

At each level, the detectors 72-86 may include logic operable by the data processing circuitry in the respective detectors to determine whether propagated alerts should be transmitted to yet other detectors or devices. In some cases, the detectors 74-86 receiving alert information may not provide any notification of the alert but simply act as a pass-through device for transmitting the alert information to a final destination, e.g., a central alert monitoring board 88 used by an operator of the industrial plant. In other cases, logic operable by the data processing circuitry in the respective detectors 74-86 (as well as the originating detector 72) may determine on a case-by-case basis whether to evaluate the received alert information and/or act on the alert information.

Embodiments of the detector 30 (see FIG. 2), which may represent any of the detectors described herein, may include a user interface 40, e.g., a button, that allows the local user of the detector to turn off some or all alert propagation to other detectors or devices. For example, a user may wish to use the detector 30 to identify a small gas leak in an industrial process. In such case, the amount of gas may not present a risk to the user carrying the detector 30. The user may manually place the detector 30 in locations where a leak is suspected. Should the detector 30 detect the presence of a gas leak, a local alert may be provided to the user of the detector 30 without alerting other detectors in the detector's vicinity or transmission range. In some embodiments, it may be preferable to limit the time in which the alert propagation is turned off so that the detector 30 may automatically return to normal operation after a period of time. Alternatively, the detector 30 may allow the user to turn off the alert propagation only while the user continuously activates the user interface 40, e.g., by holding down the button.

The alert information propagated in an alert system, such as the alert system 70 in FIG. 4, may include some or all information that is produced by or otherwise stored in the alert-generating detector 72. For example, in addition to reporting the presence or lack of a particular gas, the alert information may include data indicating the amount of gas detected. Additional data such as location data of the detector 72 and unique identification of the individual user carrying the detector 72 may be included. Alternatively, or in addition, work order data or device information that is specific to the detector 72 may be communicated. Accordingly, when alert information is propagated to other detectors 74-86 within the alert system 70, appropriate responses to the alert information may be determined and acted upon by other detectors 74-86 in the system.

It should be appreciated that the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An alert system, comprising:

a first detector that includes environmental condition detection circuitry, data processing circuitry, and wireless communication circuitry, wherein the first detector is configured to be carried by a first user, and wherein the environmental condition detection circuitry of the first detector detects environmental conditions in a vicinity of the first detector and communicates the detected environmental conditions to the data processing circuitry of the first detector; and a second detector that includes environmental condition detection circuitry, data processing circuitry, and wireless communication circuitry, wherein the second detector is configured to be carried by a second user, and wherein the environmental condition detection circuitry of the second detector detects environmental conditions in a vicinity of the second detector and communicates the detected environmental conditions to the data processing circuitry of the second detector, wherein, in response to detection of a hazardous environmental condition by the first detector, the data processing circuitry of the first detector provides notification of an alert to the first user and communicates the alert to the second detector via the wireless communication circuitry of the first detector, and when communicating the alert to the second detector, the data processing circuitry of the first detector includes an indicator of a number of hops or levels of transmission of the alert with the communication, wherein, in response to receipt of the alert from the first detector by the second detector, the data processing circuitry of the second detector determines whether to provide notification of the alert to the second user and further determines whether to transmit the alert to another detector or device based on at least one of a determined proximity to the first detector that transmitted the alert, a determined duration of time from when the first detector transmitted the alert, a determined severity of the hazardous environmental condition indicated by the alert, or the indicator of the number of hops or levels of transmission of the alert, and wherein, in response to determining to transmit the alert to another detector or device, the data processing circuitry of the second detector transmits the alert to the another detector or device via the wireless communication circuitry of the second detector, and before transmitting the alert to the another detector or device, the data processing circuitry of the second detector increments the indicator of the number of hops or levels of transmission of the alert and includes the incremented indicator with the transmission to the another detector or device.

2. The alert system of claim 1, wherein, in response to detection of a hazardous environmental condition by the second detector, the data processing circuitry of the second detector provides notification of an alert to the second user and communicates the alert to the first detector via the wireless communication circuitry of the second detector, and wherein, in response to receipt of the alert from the second detector by the first detector, the data processing circuitry of the first detector transmits the alert to another detector or device via the wireless communication circuitry of the first detector.

3. The alert system of claim 1, wherein the first detector broadcasts the alert in an ad hoc communication to the second detector without knowing that the second detector is in transmission range of the first detector.

4. The alert system of claim 1, wherein the first and second detectors communicate in a self-forming network that forms as the first and second detectors are carried within transmission range of each other.

5. The alert system of claim 1, wherein the second detector is a master device that is paired with the first detector and with additional detectors as slave devices, wherein each of the additional detectors has environmental condition detection circuitry, data processing circuitry, and wireless communication circuitry and is capable of providing notification of an alert to respective users carrying the additional detectors.

6. The alert system of claim 1, further comprising a third detector that includes environmental condition detection circuitry, data processing circuitry, and wireless communication circuitry, wherein the third detector is configured to be carried by a third user, and wherein the environmental condition detection circuitry of the third detector detects environmental conditions in a vicinity of the third detector and communicates the detected environmental conditions to the data processing circuitry of the third detector, wherein, in response to detection of the hazardous environmental condition by the first detector, the data processing circuitry of the first detector further communicates the alert to the third detector via the wireless communication circuitry of the first detector, wherein, in response to receipt of the alert from the first detector by the third detector, the data processing circuitry of the third detector determines whether to provide notification of the alert to the third user and further determines whether to transmit the alert to yet another detector or device based on at least one of a determined proximity to the first detector that transmitted the alert, a determined duration of time from when the first detector transmitted the alert, a determined severity of the hazardous environmental condition indicated by the alert, or the indicator of the number of hops or levels of transmission of the alert, and wherein, before transmitting the alert to yet another detector or device, the data processing circuitry of the third detector further increments the indicator of the number of hops or levels of transmission of the alert, and then transmits the alert with the further incremented indicator to yet another detector or device via the wireless communication circuitry of the third detector.

7. The alert system of claim 1, wherein the first detector further includes location detection circuitry, and in response to detection of the hazardous environmental condition by the first detector, the data processing circuitry of the first detector further communicates location data reflecting a location of the first detector to the second detector via the wireless communication circuitry of the first detector.

8. The alert system of claim 1, wherein the first detector further includes one or more biometric sensors configured to monitor biometric information of the first user, and in response to detection of the hazardous environmental condition by the first detector, the data processing circuitry of the first detector further communicates the biometric information of the first user to the second detector via the wireless communication circuitry of the first detector.

9. The alert system of claim 1, wherein the another detector or device is a third detector that includes environmental condition detection circuitry, data processing circuitry, and wireless communication circuitry, wherein the third detector is configured to be carried by a third user, and wherein the environmental condition detection circuitry of the third detector detects environmental conditions in a vicinity of the third detector and communicates the detected environmental conditions to the data processing circuitry of the third detector, and wherein, in response to receipt of the alert and incremented indicator from the second detector by the third detector, the data processing circuitry of the third detector determines whether to provide notification of the alert to the third user and further determines whether to transmit the alert to yet another detector or device based on at least one of a determined proximity to the second detector that transmitted the alert, a determined duration of time from when the second detector transmitted the alert, a determined severity of the hazardous environmental condition indicated by the alert, or the indicator of the number of hops or levels of transmission of the alert, and wherein, before transmitting the alert to yet another detector or device, the data processing circuitry of the third detector further increments the indicator of the number of hops or levels of transmission of the alert, and then transmits the alert with the further incremented indicator to yet another detector or device via the wireless communication circuitry of the third detector.

10. The alert system of claim 1, further comprising additional detectors or devices that receive the alert from the first detector or the second detector with an indicator of the number of hops or levels of transmission of the alert, wherein each of the additional detectors or devices increments the indicator received with the respective alert before transmitting the alert to yet another detector or device.

11. The alert system of claim 10, wherein each additional detector is configured to be carried by a user and includes environmental condition detection circuitry, data processing circuitry, and wireless communication circuitry, wherein the environmental condition detection circuitry of each additional detector detects environmental conditions in a vicinity of the additional detector and communicates the detected environmental conditions to the data processing circuitry of the additional detector.

12. The alert system of claim 1, wherein when it is determined to provide the alert notification to the second user, a sensory output of the alert notification is determined based on at least one of a determined proximity to the first detector that transmitted the alert, a determined duration of time from when the first detector transmitted the alert, a determined severity of the hazardous environmental condition indicated by the alert, or the indicator of the number of hops or levels of transmission of the alert.

13. The alert system of claim 1, wherein, in response to receipt of the alert from the first detector by the second detector, the data processing circuitry of the second detector determines to provide the alert notification to the second user in addition to transmitting the alert to another detector or device.

14. The alert system of claim 1, wherein the first and second detectors further include a user interface that, when activated by a user, causes the data processing circuitry of the respective first or second detector to not transmit the alert to another detector or device.

15. A method of communicating an alert in a network of detectors in wireless transmission range of one another, each detector being configured to be carried by a user and including environmental condition detection circuitry, data processing circuitry, and wireless communication circuitry, the method comprising:

for each detector in the network of detectors:

detecting an environmental condition in a vicinity of the respective detector; and communicating detection data based on the detected environmental condition to the data processing circuitry of the respective detector;

in response to detection of a hazardous environmental condition by a first detector in the network of detectors, providing notification of an alert to the user carrying the first detector and communicating the alert to one or more second detectors via the wireless communication circuitry of the first detector, wherein when communicating the alert to the one or more second detectors, including an indicator of a number of hops or levels of transmission of the alert, in response to receipt of the alert from the first detector by the one or more second detectors, further incrementing the indicator of the number of hops or levels of transmission for transmission of the alert with the further incremented indicator to yet another detector or device via the wireless communication circuitry of the respective second detector, and in response to receipt of the alert, determining by the one or more second detectors and/or the yet another detector or device whether to provide notification of the alert to a user and further determining whether to transmit the alert to another detector or device based on at least one of a determined proximity to the detector or device that transmitted the alert, a determined duration of time from when the detector or device transmitted the alert, a determined severity of the hazardous environmental condition indicated by the alert, or the indicator of the number of hops or levels of transmission of the alert.

16. The method of claim 15, wherein when it is determined to provide the alert notification to the user, further determining a sensory output of the alert notification based on at least one of a determined proximity to the detector or device that transmitted the alert, a determined duration of time from when the detector or device transmitted the alert, a determined severity of the hazardous environmental condition indicated by the alert, or the indicator of the number of hops or levels of transmission of the alert.

* * * * *